United States Patent [19]
Furutsu

[11] Patent Number: 6,041,923
[45] Date of Patent: Mar. 28, 2000

[54] CD EJECTOR DEVICE

[76] Inventor: Akira Furutsu, 704, Ryogoku 2-20-12, Sumida-ku, Tokyo, Japan

[21] Appl. No.: 09/193,728

[22] Filed: Nov. 17, 1998

[30] Foreign Application Priority Data

Apr. 15, 1998 [JP] Japan .................................. 10-104255
Aug. 28, 1998 [JP] Japan .................................. 10-242669

[51] Int. Cl.$^7$ .................................................. B65D 85/30
[52] U.S. Cl. ...................... 206/308.1; 206/310; 206/493; 206/804
[58] Field of Search ................................. 206/308.1, 310, 206/309, 493, 804

[56] References Cited

U.S. PATENT DOCUMENTS

| | | | |
|---|---|---|---|
| 4,750,618 | 6/1988 | Schubert | 206/309 |
| 4,871,064 | 10/1989 | Hehn et al. | 206/387 |
| 5,251,750 | 10/1993 | Gelardi et al. | 206/310 |
| 5,383,557 | 1/1995 | Weisburn et al. | 206/387.13 |
| 5,400,902 | 3/1995 | Kaminski | 206/310 |
| 5,829,582 | 11/1998 | Ippolito et al. | 206/308.1 |

*Primary Examiner*—Paul T. Sewell
*Assistant Examiner*—Nuan T. Lam
*Attorney, Agent, or Firm*—Nikaido, Marmelstein, Murray & Oram, LLP

[57] ABSTRACT

A CD ejector device comprising a push member, push plates and a spring plate extending equidistantly from the push member in such a fashion as to be capable of being accommodated in radial grooves formed at a disk support portion at the center of a tray of a CD case, and engagement protuberances so formed on the side surface of the spring plate as to engage with the side surfaces of the groove, the CD ejector device being molded integrally from a synthetic resin. When the push member is pushed, the push plates are jumped up and the CD anchored to the disk support portion can be easily ejected. This CD ejector device can be operated easily by one hand.

9 Claims, 10 Drawing Sheets

CD EJECTOR DEVICE

BACKGROUND OF THE INVENTION

1. Field of the Invention

This invention relates to a compact disk (hereinafter called the "CD") ejector device capable of ejecting a CD from a CD case by one-touch operation.

2. Description of the Prior Art

As shown in FIG. 14 of the accompanying drawings, a case 1 of a CD case includes a main body 1a of a transparent synthetic resin and a cover 1b, and a tray 2 forming a synthetic resin thin plate is disposed inside the case 1. A disk support portion 4 for supporting the CD 5 is disposed at the center of this tray 2 in such a manner as to flexibly expand and to engage with the center hole 5a of the CD 5.

The tray 2 defines a disk-like recess portion so as to accommodate the CD 5 and the disk support portion 4 is so formed as to protrude from the center of the tray 2. The periphery of a hole 4a opening at the center of this disk support portion 4 is arranged to protrude in the ring form as shown in FIG. 15 and equidistant grooves 4b are radially formed at the periphery of the ring-like portion. A substantial cylindrical engagement portion 3 is formed by separating protruding plates 4c having a key-shaped side section from one another by these grooves 4b and disposing plane-wise the plates 4c in a chrysanthemum shape. The CD 5 is anchored by engaging its center hole 5a with this engagement portion 3. When the center portion (of the upper surface) of the engagement portion 3 having the shape of chrysanthemum petals formed as the distal end portions of these protruding plates 4c gather together into a group is pushed, the distal end portions of the protruding plates 4c face downward, so that the outer diameter of the engagement portion 3 shrinks and the CD 5 pushed and anchored to the circumferential surface of this engagement portion 3 by the hole 5a come to be possible to be ejected.

To eject the CD 5 anchored to the engagement portion 3 provided to the center of the tray 2 from the case 1, the CD 5 is forcedly ejected from the engagement portion 3 by supporting the edge portions on both sides of the CD 5 by two fingers, or by pushing the center of the engagement portion 3 by the finger tip, so as to shrink the outer diameter of the engagement portion 3.

According to the former method, however, both hands are necessary to take out the CD 5. Moreover, because the force that causes warping of the CD 5 is imparted, the CD 5 is damaged in some cases. According to the latter, while the CD case 1 is supported by one hand and the center of the engagement portion 3 at the center of the tray 2 is pushed by the forefinger of the other hand, the CD 5 is taken out while being supported at both side edges by the finger tips of the thumb and the fifth finger. Alternatively, the CD case 1 is placed on the desk, etc, and the CD 5 is supported at both side edges by the finger tips of the thumb and the fifth finger of one of the hands and then taken out while the center portion of the engagement portion 3 of the tray 2 being pushed by the forefinger of the other hand. In either case, handling of the CD 5 is troublesome and is difficult particularly for children with small hands.

To solve the problem described above encountered when the CD is taken out from the CD case, Japanese Utility Model Publication No. 12313/1995 proposes a disk anchoring structure of a CD tray.

According to this prior art reference, a push member 6 (reference numerals used in the reference will be used hereby directly) and blade-like plates 12 the distal end of which is pushed up when the push member 6 is pushed are supported at the center of a round hole 5 of a tray 1 placed inside a CD case, by support plates 8 extending from the periphery of the round hole 5 towards its center. The support plate 8 is bent into the Z shape comprising a horizontal plate portion, a vertical plate portion and another horizontal plate portion, and the vertical plate portions aligned in circle are engaged with the hole of the CD so as to support the CD on the tray 1.

To take out the CD, the push member 6 is pushed by a finger tip so as to jump up the distal end portions of the blade-like plates 12 and to push the periphery of the hole of the CD from below. Consequently, the CD anchored to the vertical plate portions of the support plates 8 can be ejected.

This disk anchoring structure is excellent in that the CD can be easily ejected from the tray 1 by pushing merely the push member 6, but because the push member 6 and the blade-like plates 12 must be disposed integrally with the CD support portion at the center of the tray 1, the structure of the tray 1 becomes complicated and the cost of production becomes high. When the tray 1 having this structure is produced, the push member 6 must be disposed integrally. Therefore, this technology cannot be applied to the CD cases that have already been put on the market. Further, when the push member 6 is cut off from the support plates 8 extending to the center of the tray 1, the CD case must be discarded as a whole. When the support plates 8 undergo deformation with the passage of time, the CD cannot be anchored any longer.

SUMMARY OF THE INVENTION

The present invention is directed to solving the problems of the conventional CD cases described above, and provides a CD ejector device which comprises a push member, push plates and a spring plate extending equidistantly from the push member in such a fashion as to be capable of being accommodated inside radial grooves defined in a disk support portion at the center of a tray of a CD case, and engagement protuberances engaging with the side surfaces of the grooves and formed on the side surface of each spring plate, whereby the CD ejector device is molded integrally from a synthetic resin.

A CD ejector according to another embodiment of the present invention comprises a push member, push plates and a spring plate extending equidistantly from the push member in such a fashion as to be capable of being accommodated inside radial grooves defined in a disk support portion at the center of a tray of a CD case, engagement protuberances engaging with the side surface of the grooves and formed on the side surfaces of each spring plate and eaves members so formed at the upper end of the push member as to expand in a transverse direction and to come into contact with the disk support portion, whereby the CD ejector device is molded integrally from a synthetic resin.

The number of the eaves members is two to four and they are so formed as to extend substantially equidistantly and radially with the push member as the center.

Each push plate comprises a spring portion extending obliquely downward from the push member and a portion extending horizontally from the spring portion. When the push member is pushed down, the spring portion is curved and so operates as to push up the distal end portion of the horizontally extending portion with the joint portion between the spring portion and the horizontally extending portion as the starting point.

Further, the number of push plates is two or three while the number of spring plate is one or two, and they are so disposed as to extend substantially equidistantly and radially with the push member as the center.

DESCRIPTION OF THE PREFERRED EMBODIMENTS

Hereinafter, the present invention will be explained with reference to the accompanying drawings.

(1) As shown in FIGS. 1 to 4, a CD ejector device 10 has three legs and is shaped by integral molding of a synthetic resin into a structure in which a push member 11 is disposed at the center, and two push plates 12 and a spring plate 13 are equidistantly disposed in such a manner as to extend radially from the push member 11. A synthetic resin having high restoring force such as a nylon resin or a polyacetal resin is preferably used as the material. (This holds true also of the later-appearing other embodiments).

Figure 1:
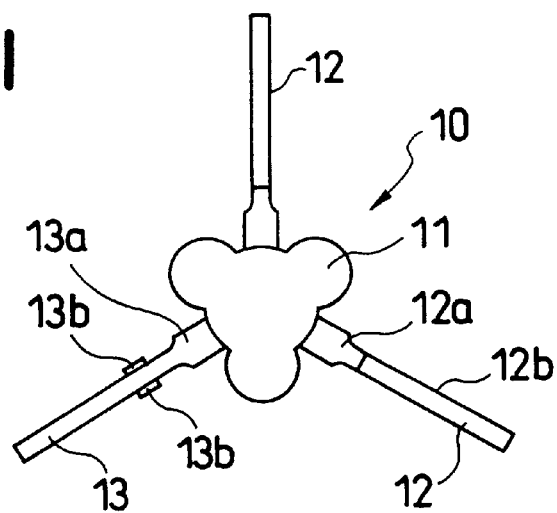
FIG. 1 is a plan view of a CD ejector device.
Figure 2:
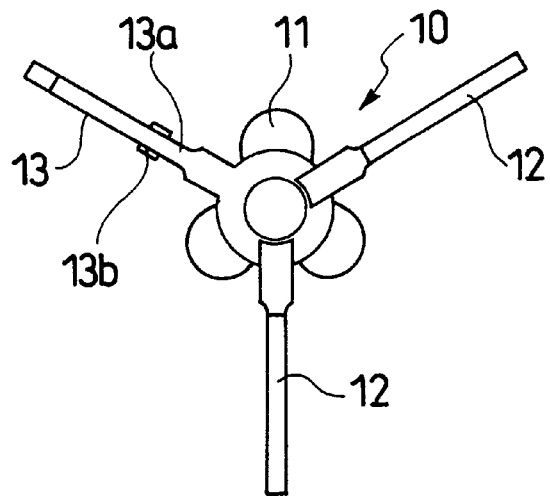
FIG. 2 is a bottom view of the CD ejector device.
Figure 3:
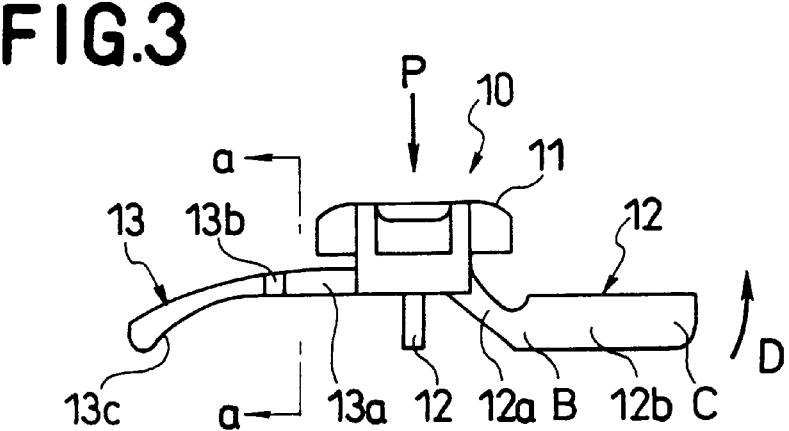
FIG. 3 is an exploded side view of the CD ejector device.
Figure 4:
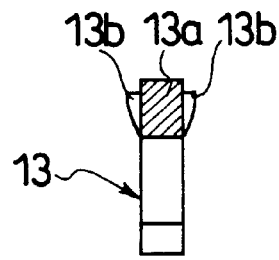
FIG. 4 is a sectional view taken along an arrow a—a in FIG. 3.

As shown in FIG. 3, each push plate 12 comprises a spring portion 12a that is extended obliquely downward and a push-up portion 12b that is extended in a horizontal direction (or a transverse direction). The spring plate 13 comprises a portion 13a extending from the portion fixed to the push member 11 in the horizontal direction (or the transverse direction) and a portion 13c extending down in a curved form from the distal end of the portion 13a. Further, an engagement protuberance 13b shown in FIG. 4 is provided to both side surfaces (or one side surface) of the horizontally extending portion 13a. This push plate 12 plays the function of pushing up the CD from below when the CD ejector device 10 is pushed. On the other hand, the spring plate 13 so holds the CD ejector device 10 as to let it operate softly due to the spring effect and imparts a soft touch to the finger tips. The spring plate 13 and the push plate 12 cooperate with each other and provide excellent stability and balance to the CD ejector device 10.

The method of using the CD ejector device 10 having such a structure is as follows.

Figure 5:
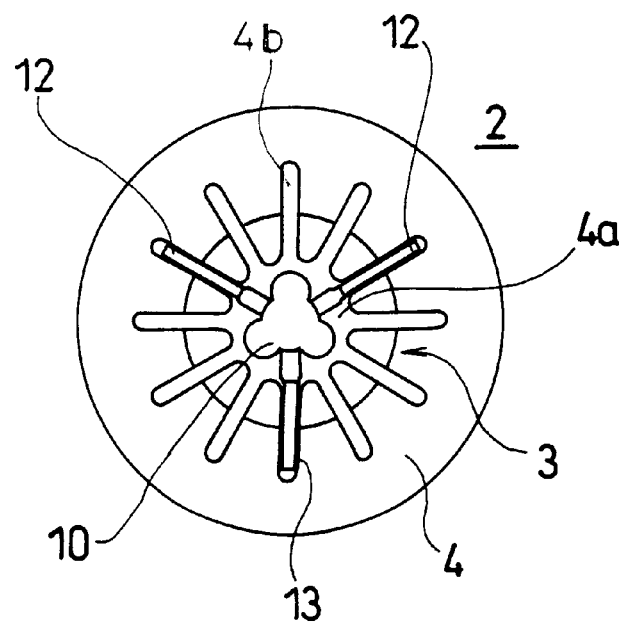
FIG. 5 is a plan view showing the state where the CD ejector device is fitted into a disk support portion.
Figure 14:
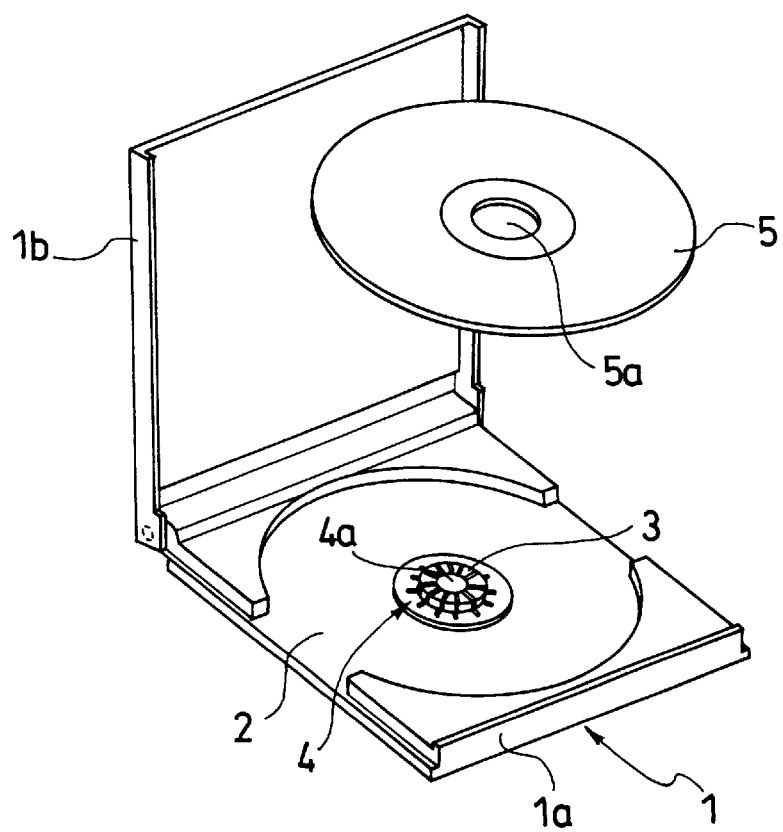
FIG. 14 is a perspective view showing a relationship between the CD case and a CD.
Figure 15:
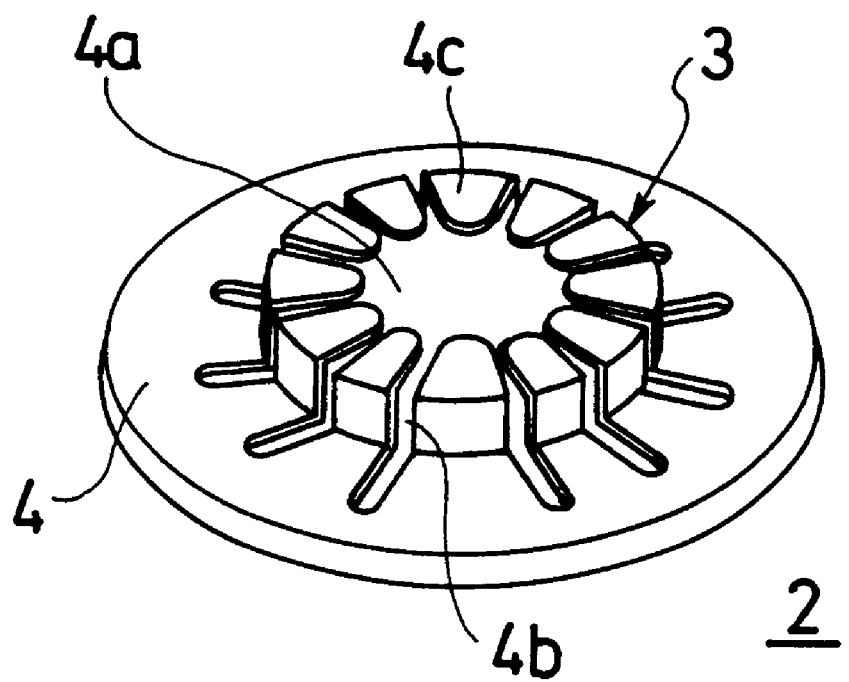
FIG. 15 is a perspective view of a disk support portion of a CD case having an engagement portion at the center.

First, as shown in FIG. 5, the push member 11 of the CD ejector device 10 is fitted into the hole 4a formed at the center of the engagement portion 3 constituted at the disk support portion 4 of the tray 2 shown in FIGS. 14 and 15, and the push plates 12 and the spring plate 13 are then fitted into the grooves 4b defined between the adjacent protruding plates 4c. Under this state, the engagement protuberances 13b formed on both side surfaces (or on one surface) of the spring plate 13 are anchored to both side surfaces (or one surface) of the grooves 4b.

The engagement protuberance 13b is directed to exhibiting the anchoring function and to reliably fit and keep the CD ejector device 10 to and at a predetermined position of the disk support portion 4, and even when the CD case is swayed or inverted, the CD ejector device 10 is prevented from falling off from the disk support portion 4 and from shaking inside the disk support portion 4. Though not shown in detail in the drawings, the upper surface of the push member 11 is almost at the same level as the upper surface of the protruding plate 4c or slightly protrudes from the latter. Therefore, when the upper surface of the push member 11 is pushed by the finger, the distal end of the protruding plate 4c, too, is pushed either simultaneously or a little belatedly, so that the diameter of the substantially cylindrical engagement portion 3 formed at the center of the tray 2 shrinks.

The push-up portion 12b of the push plate 12 is so positioned as to extend horizontally along the surface of the main body 1a while the push member 11 is not pushed, as shown in FIG. 3, but when the pressure P acts on the push member 11 and causes the push plate 12 and the spring plate 13 to sink and to undergo deformation in the direction of this pressure P, they are supported on the surface of the main body 1a of the CD case 1 with the joint portion B between the push-up member 12b and the spring portion 12a or the portion nearby functioning as the support point and the spring portion 12a is bent. At the same time, the distal end portion C of the push-up portion 12b is jumped up as indicated by the arrow D. In this instance, the push member 12b so operates as to push up the back of the CD 5 by means of its distal end portion as will be described later.

When two push plates 12 and one spring plate 13 are equidistantly provided to one CD ejector device 10 as described above, the force that pushes up the CD 5 from below is generated by only these push plates 12, but this force is sufficient as the force for ejecting the CD 5 from the engagement portion 3. In other words, the protruding plate 4c of the engagement portion 3, too, is pushed and undergoes deformation simultaneously with the sink of the push member 11 and the outer diameter of the engagement portion 3 shrinks, so that the engagement force between the engagement portion 3 and the CD 5 is reduced or is released.

Figure 6:
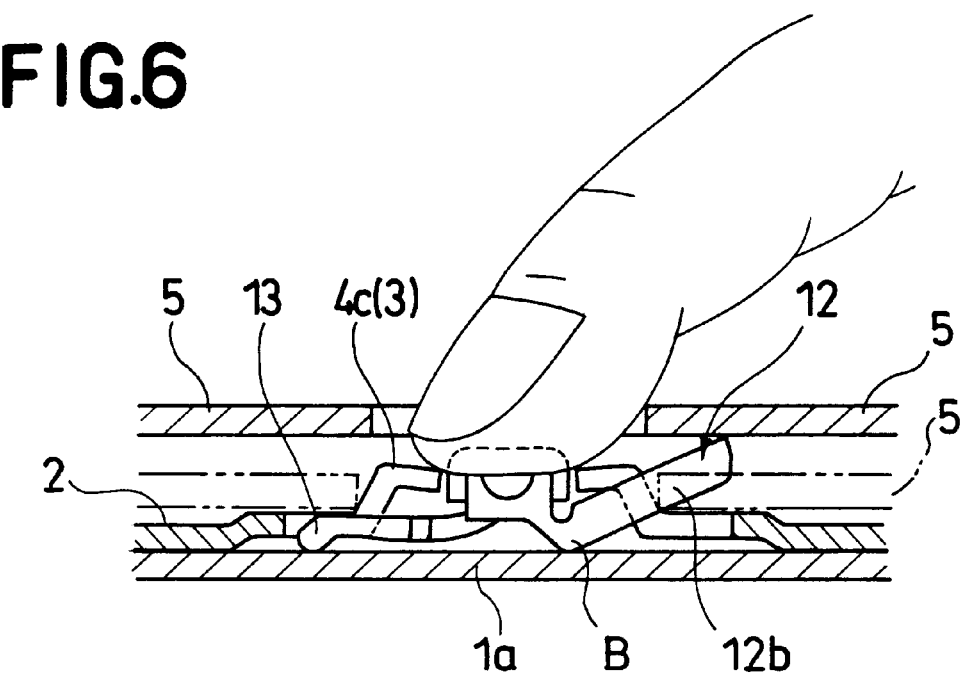
FIG. 6 is a sectional side view useful for explaining movement of the CD ejector device.

When the push member 11 is pushed by the finger tip as shown in FIG. 6, the chrysanthemum-shaped group portion of the protruding plates 4c constituting the engagement portion 3 is pushed subsequently or simultaneously. In consequence, both the push member 11 and the engagement portion 3 sink. When the anchor state between the protruding plates 4c and the CD 5 is released, the distal end portions of the push plates 12 rise simultaneously and push up the CD 5. Even if the force is removed from the push member 11 under this state, the CD 5 is no longer anchored to the engagement portion 3 and can be easily taken out from the case.

Figure 7:
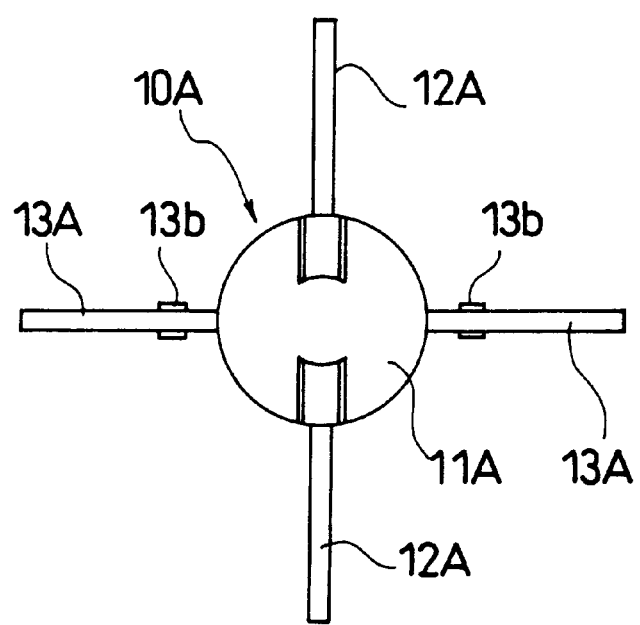
FIG. 7 is a plan view of a CD ejector device in another structure (with four legs)

FIG. 7 is a plan view of the CD ejector device 10A according to another embodiment. Two push plates 12A are linearly extended from the push member 11A and furthermore, two spring plates 13A are linearly extended from the push member 11A in such a manner as to orthogonally cross the push plates 12A. The CD ejector device 10A having this structure can be used in the same way as the CD ejector device described above, but is more stable than the three-legged device and can be operated smoothly.

(2) Though the CD ejector device of the embodiments described above is excellent, the structure must be somehow modified in the following cases.

A. As shown in FIG. 5, in the case of the tray 2 having the structure such that when the push member 11 of the ejector device 10 is fitted into the hole 4a of the disk support portion 4 and the push plates 12 and the spring plate 13 are fitted into the grooves 4b formed between the adjacent protruding plates 4c, the height of the ejector device 10 is lower than the height of the upper surface of the protruding plate 4c (in the case of the CD case having a large distance between the main body 1a and the upper surface of the protruding plate 4c):

In this case, the push member 11 is buried, or sinks, into the hole 4a and the upper surface of the push member 11 becomes lower than the upper surface of the protruding plate 4c, so that it becomes difficult to push the upper surface of the push member 11 or the later-appearing problems develop.

Figure 8:
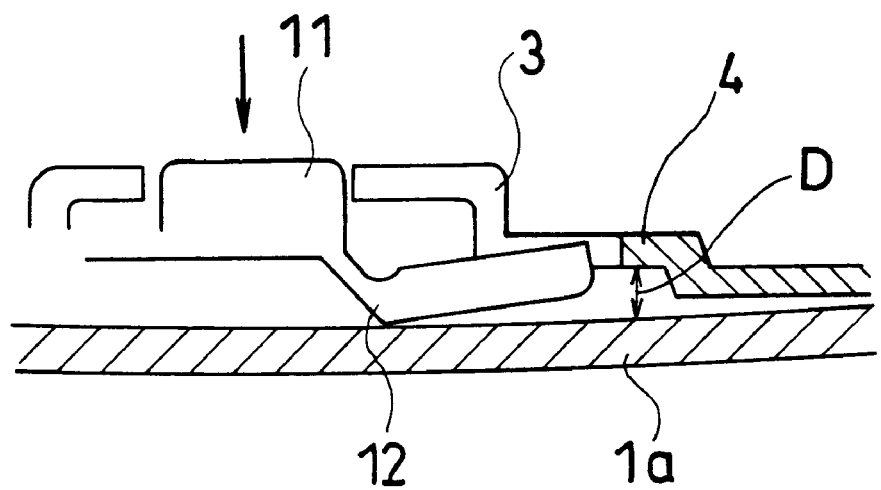
FIG. 8 is an explanatory view showing the state where a CD case is held by one hand and the CD ejector device fitted into a disk support portion is pushed by the forefinger of the other hand.

B. Alternatively, when the CD case 1 is kept by one hand and the push member 11 of the ejector device 10 protruding from the upper surface of the protruding plate 4c is pushed by the forefinger of the other hand, the bottom of the main body 1a is pushed and curved by the push plates 12 and the spring plate 13 of the push member 11, so that the gap D between the main body 1a and the disk support portion 4 increases as shown in FIG. 8, the distal end portions of the push plates 12 do not protrude from the disk support portion 4 even when they jump up, and do not reach the CD 5 engaging with the engagement portion 3 in some cases.

(3) Next, the CD ejector devices of two improved types according to the present invention will be explained.

A. First, the CD ejector device 10B of the first type will be explained with reference to FIGS. 9(a) and 9(b).

Figure 9:
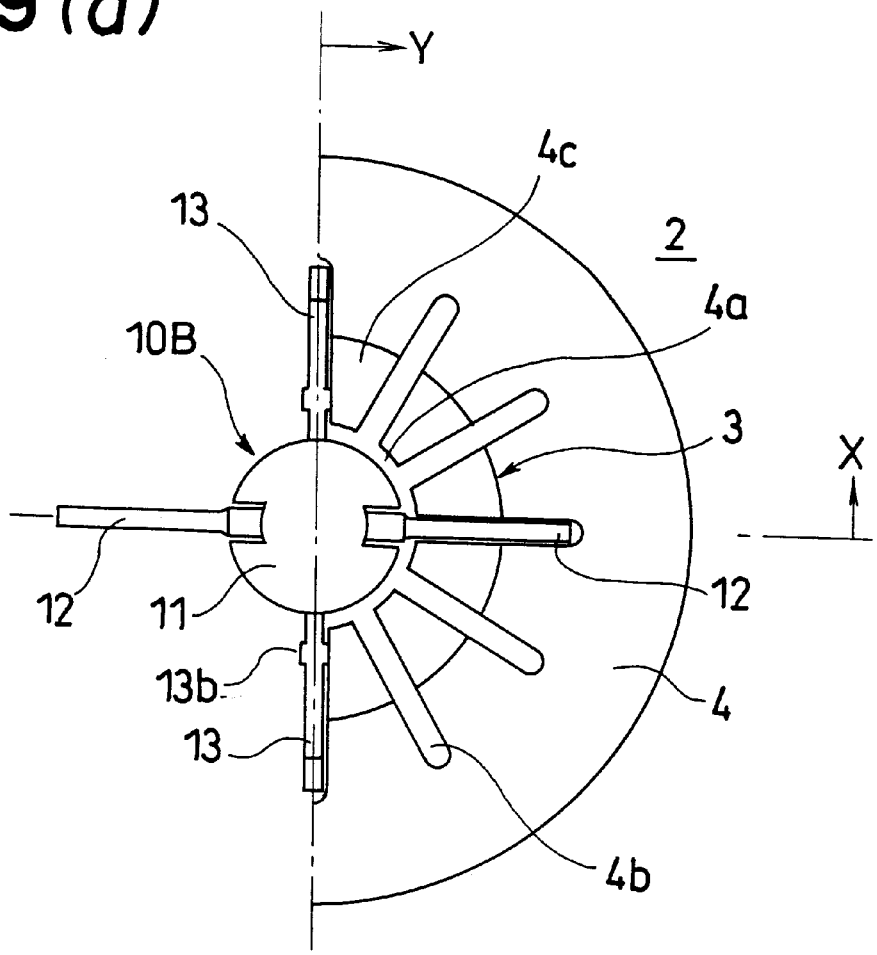
FIG. 9(a) is an explanatory (plan) view showing the state where a CD ejector device of a first improved type is fitted into the disk support portion.
FIG. 9(b) is a sectional side view showing the state where the CD ejector device is fitted to the disk support portion.
Figure 9:
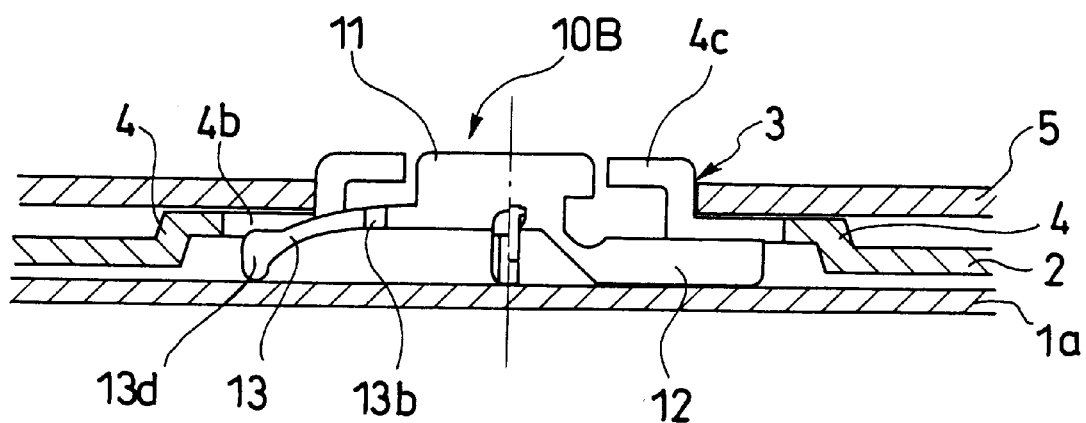
Figure 10:
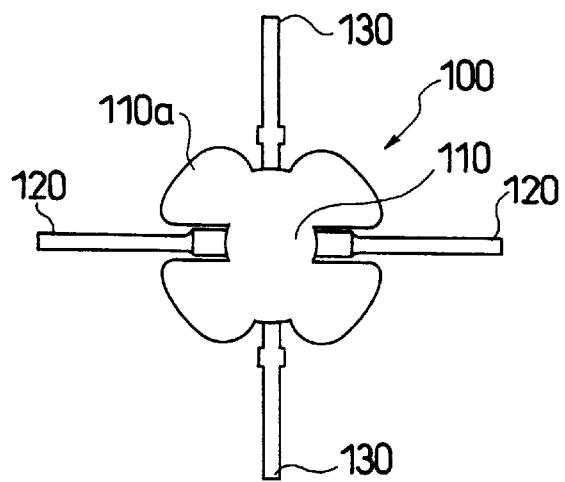
FIG. 10(a) in a plan view of a CD ejector device of a second improved type.
FIG. 10(b) is a front view of the CD ejector device.
FIG. 10(c) is a bottom view of the CD ejector device.
FIG. 10(d) is a side view of the CD ejector device.
Figure 10:
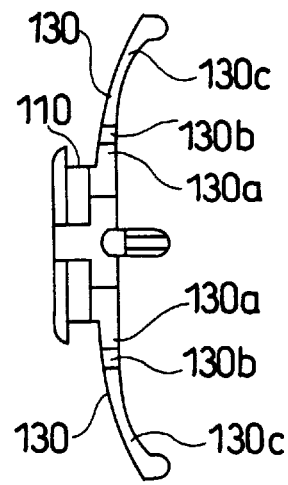
Figure 10:
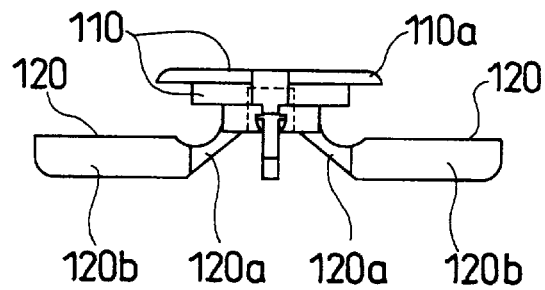
Figure 10:
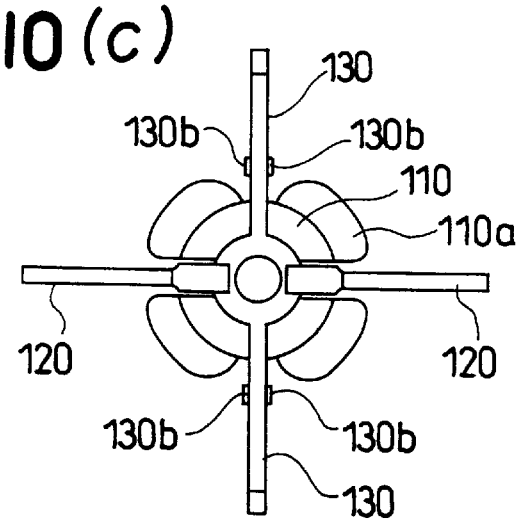

FIG. 9(a) is an explanatory view showing the state where the CD ejector device 10B is fitted to the disk support portion 4 of the tray 2. However, the drawing shows only the right-hand half portion of the disk support portion 4 of the tray 2 for the sake of convenience of explanation, and the left-hand portion is omitted.

As shown in this drawing, the push member 11 of the ejector device 10B is fitted into the hole 4a at the center of the engagement portion 3 constituted at the disk support portion 4 of the tray 2, and the push plates 12 and the spring 13 are fitted into the grooves 4b formed between the adjacent protruding plates 4c, respectively.

FIG. 9(b) is a sectional side view showing the state where the ejector device 10B shown in FIG. 9(a) is fitted into the disk support portion 4 of the tray 2. This is a synthetic view formed by arranging the state viewed in the X direction in FIG. 9(a) on the right side and the state viewed in the Y direction on the left side. It also shows the state where the CD 5 engages with the engagement portion 3 of the disk support portion 4.

Incidentally, the disk support portion 4 and the protruding plate 4c of this CD case are formed to be higher than those of the CD case of the normal size. Therefore, the upper surface of the push member 11 under the fitted state exists at substantially the same level as the upper surface of the protruding plate 4c and there is no problem when the push operation is made first. However, once the push member 11 is pushed, the spring plate 13 deviates in the transverse direction, comes off from the groove 4b of the disk support portion 4, goes below the protruding plate 4c and is pushed down in some cases. When such a case occurs, the spring plate 13 does not operate effectively at the time of the push operation of the second time and so on, and since the upper surface of the push member 11 becomes lower, the push operation becomes difficult.

To prevent such inconvenience, the thickness of the distal end portion of the spring plate 13 is increased so that the spring plate 13 rises as shown in FIG. 9(b). Therefore, this type employs the structure such that the upper end of the distal end portion 13d is positioned somehow above the lower edge of the side surface of the groove 4b of the disk support portion 4 and the upper portion of the distal end portion 13d is always hooked on the side surface of the groove 4b of the disk support portion 4. According to this structure, even when the push member 11 is pushed, the spring plate 13 always remains inside the groove 4b of the disk support portion 4 and does not come off therefrom. In this way, the problem described above can be solved.

B. Next, the second improved type will be explained with reference to FIGS. 10(a) to 10(d). This embodiment is directed to coping with the case where the upper surface of the protruding plate 4c is formed to a higher level than in the above-mentioned embodiment.

The four-legged ejector device 100 is produced by disposing a push member 110 at the center, and two push plates 120 and two spring plates 130 in such a manner as to extend equidistantly and radially from the push member 100 and integrally molding them from a synthetic resin.

Four screw- or petal-like eaves members 110a are so formed as to extend equidistantally and radially from the upper end of the push member 110 with this member 110 being the center.

Each push plate 120 comprises a spring portion 120a extending obliquely downward and a push-up portion 120b extending in the horizontal direction (or in the transverse direction) from the distal end of the spring portion 120a.

Each spring plate 130 comprises a portion 130a extending in the horizontal (or transverse) direction from the portion fixed to the push member 110 and a portion 130c extending curvedly downward from the distal end of the portion 130a. Furthermore, engagement protuberances 130b are disposed on both side surfaces (or on one side surface) of this horizontally extending portion 130a.

Figure 11A:
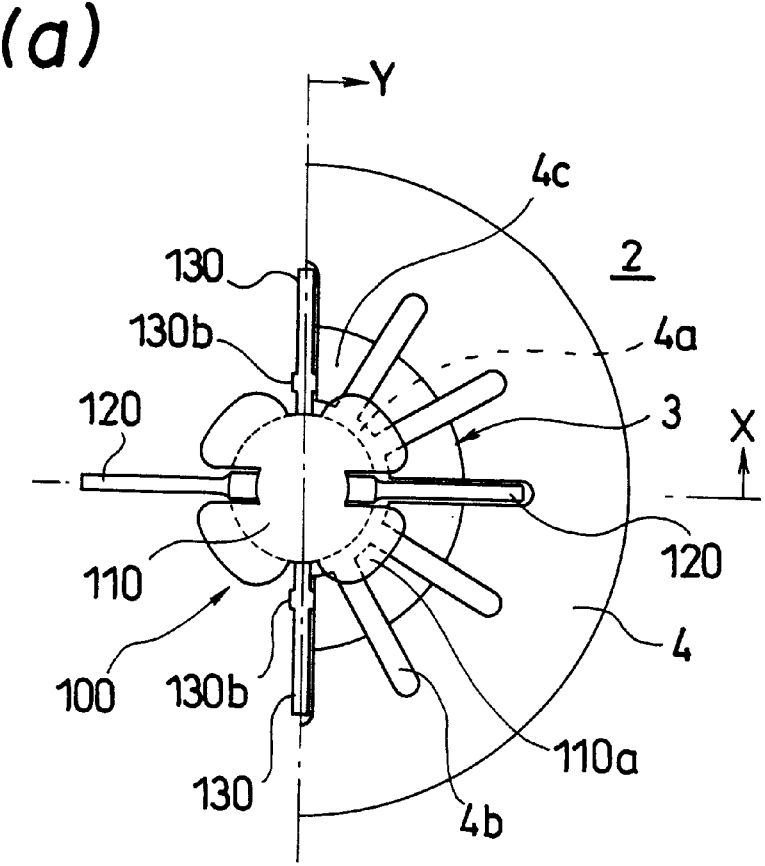
FIG. 11(a) is an explanatory (plan) view showing the state where the CD ejector device of the second improved type is fitted into the disk support portion.

FIG. 11(a) is an explanatory view showing the state where the ejector device 100 is fitted to the disk support portion 4 of the tray 2. The drawing shows only the right-hand half portion of the disk support portion 4 of the tray for the sake of convenience of explanation and the left-hand portion is omitted.

As shown in this drawing, the push member 110 of the ejector device 100 is fitted into the hole 4a formed at the center of the engagement portion 3 constituted at the disk support portion 4 of the tray 2, and the push plates 120 and the spring plates 130 are fitted into the grooves 4b formed between the adjacent pairs of the protruding plates 4c.

One of eaves members 110a of the push member 110 covers the distal end portions of a plurality of (three or two) protruding plates 4c.

Figure 11B:
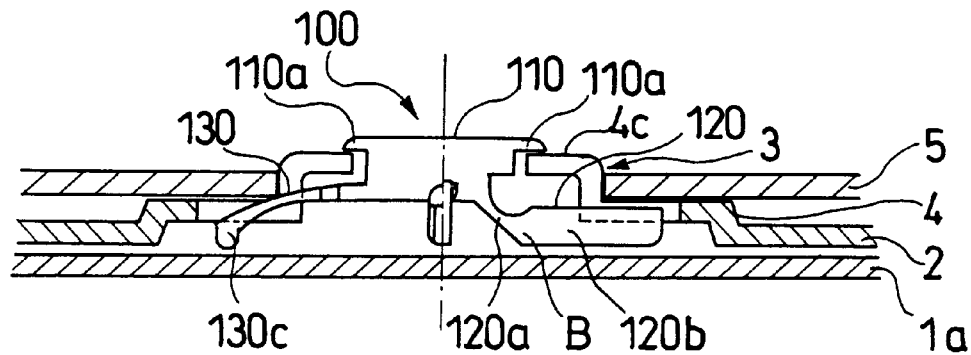
FIG. 11(b) is a sectional side view showing the state where the CD ejector device is fitted into the disk support portion.

FIG. 11(b) is a sectional side view showing the state where the ejector device 100 shown in FIG. 11(a) is fitted into the disk support portion 4 of the tray 2. This is a synthesis view of the drawing when the right-hand portion of the ejector device 100 viewed in the X direction in FIG. 11(a) is disposed on the right side and the drawing when the ejector device viewed in the Y direction is disposed on the left side. This drawing shows also the state where the CD 5 engages with the engagement portion 3 of the disk support portion 4.

Figure 11C:
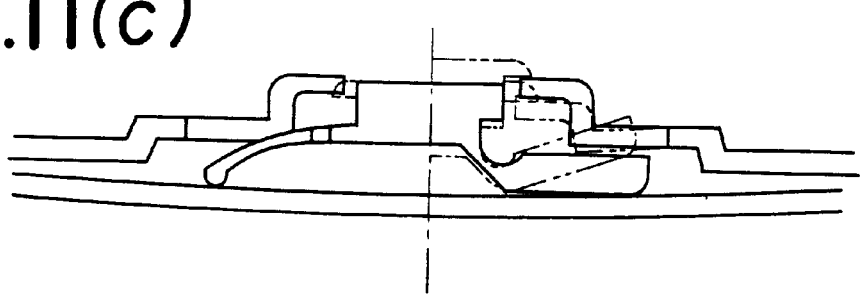
FIG. 11(c) is a sectional side view showing the state where a push member of the CD ejector device is pushed.

As shown in this drawing, even in the case of the disk support portion 4 of the tray 2 whose protruding plates 4c are formed higher than the ejector device 100, the eaves member 110a of the push member 110 comes into contact with the protruding plate 4c in such a manner as to cover the distal end portion of the protruding plate 4c. Therefore, the upper surface of the push member 110 exists at a position above the distal end portion of the protruding plate 4c and the upper surface of the push member 110 can be easily pushed. Since the push member 110 is positioned at a higher position by this eaves member 110a, the push portion 120b of the push plate 120 and the lower extension portion 130c of the spring plate 130 exist at positions which somewhat float from the upper surface of the main body 1a. When the upper surface of the push member 110 is pushed down, however, the distal end portion of the protruding plate 4c is pushed down by the eaves member 110a as shown in FIG. 11(c). In consequence, the diameter of the engagement portion 3 diminishes, the eaves member 110a is curved a little, the push member 110 sinks, the push-up portion 120b of the push plate 120 reaches the upper surface of the main body 1a and is pushed to the upper surface, the spring portion 120a is curved, the distal end of the push-up portion 120b of the push plate 120 is thereby jumped up, and the CD 5 engaging with the engagement portion 3, not shown, is pushed up by the distal end of the push-up portion 120b and is ejected from the engagement portion 3.

Needless to say, this ejector device 100 can be used also for the CD case whose protruding plate 4c has the normal height. Therefore, this ejector device can be said a versatile type.

The eaves member 110a has also the operation of pushing uniformly and reliably the distal end portion of the protruding plate 4c. Therefore, when the CD case 1 is held by one hand and the push member 11 of the ejector device 10 protruding from the upper surface of the protruding plate 4c is pushed by the forefinger of the other hand, the disk support portion 4 is pushed and lowered by the eaves member 110a unlike in the case shown in FIG. 8 even when the main body 1a at the bottom is pushed, deflected and curved by the spring plates 130 and the push plates 12. Because the gap D between the disk support portion 4 and the main body 1a does not expand in this case, the distal end of the push plate 120 which is jumped up (the distal end of the push-up portion 120b) can sufficiently protrude from the disk support portion 4, the push plate 120 can reach the CD 5 engaged with the engagement portion 3, and can consequently push up and eject the CD 5.

Incidentally, if the protruding plate 4c has particularly high hardness, the resilient force of the distal end portion of the protruding plate 4c is strong when the upper surface of the push member 110 is pushed down, and a strong force is necessary to push down the distal end portion of the protruding plate 4c.

Figure 12:
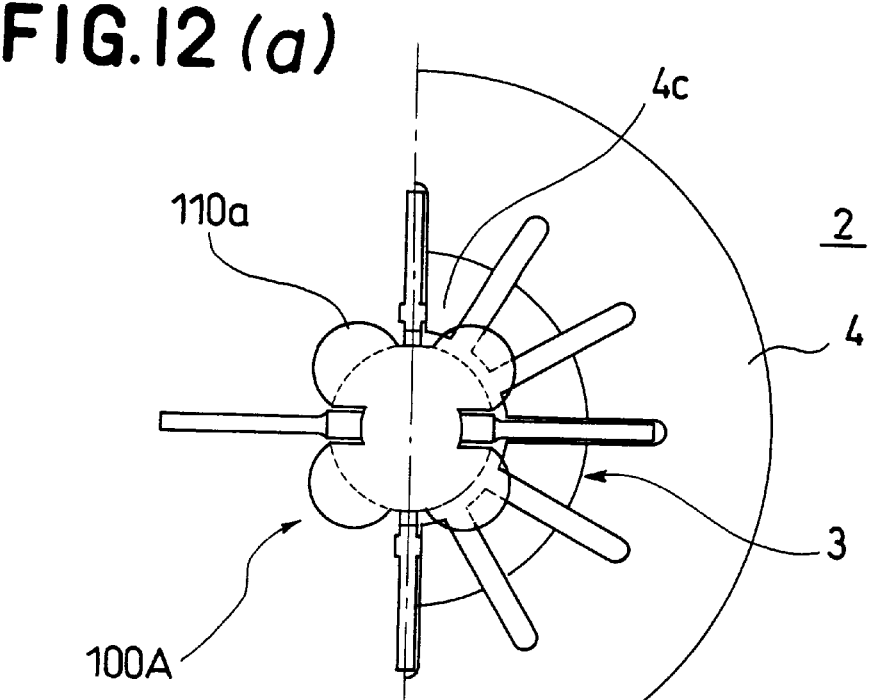
FIG. 12(a) is an explanatory (plan) view showing the state where a CD ejector device of the second improved type in another structure is fitted into a disk support portion.
FIG. 12(b) is an explanatory (plan) view showing the state where a CD ejector device of the second improved type in still another structure is fitted into the disk support portion.
Figure 12:
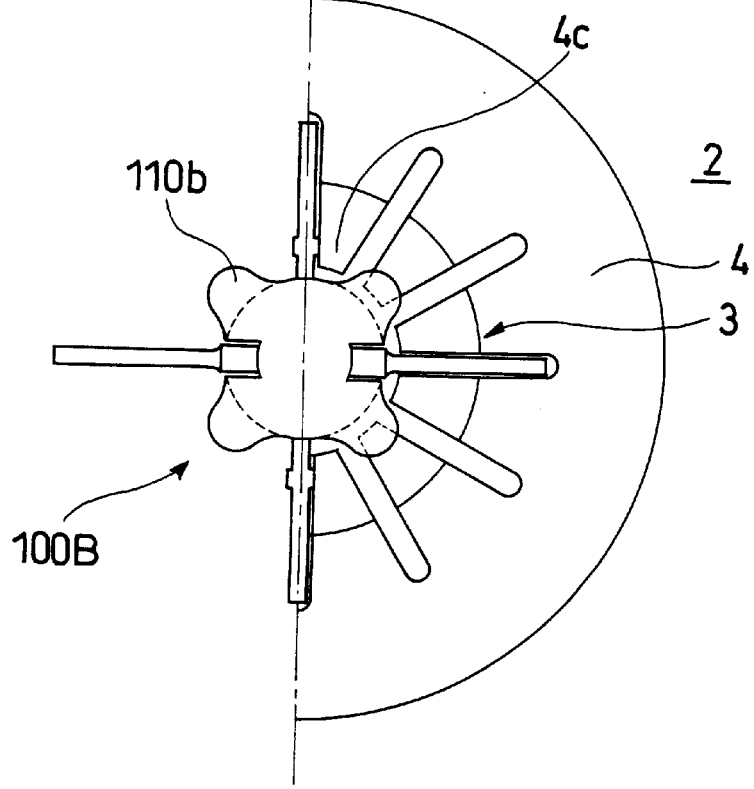

In such a case, it is advisable to form the eaves member 110a to a small width in such a manner as to cover, on the 1:1 basis, the distal end portion of the protruding plate 4c by one eaves member 110a and to slightly hook on the edge portions of the distal end portions of both of adjacent protruding plates 4c as shown in FIG. 12(a). Alternatively, it is possible to further reduce the width of the eaves member 110b as in the ejector device 110B shown in FIG. 12(b) in such a manner as to cover on the 1:1 basis only the distal end portion of one protruding plate 4c by one eaves member. Thus the resilient force of the distal end portion of the protruding plate 4c is suitably reduced when the upper surface of the push member 110 is pushed down so that the push member 110 sinks when it is pushed merely gently.

In this case, as the push member 110 sinks when pushed, the distal end portions of some of the protruding plates 4c sink while those of others do not, and the protruding plates 4c which are released from the engagement with the CD 5 and those which are not released co-exist. Therefore, though the diameter of the engagement portion 3 does not always shrink, the anchoring force of the engagement portion 3 to the CD 5 is drastically reduced, and the CD 5 can be sufficiently pushed up and ejected by the distal end of the push-up plate 120 which has jumped up.

In the four-legged ejector device 100, 100A or 100B, the number of the four eave members 110 and 110a or 110b can be reduced to the half and only two eaves members opposing each other across the center point can achieve the structure of the present invention.

Figure 13:
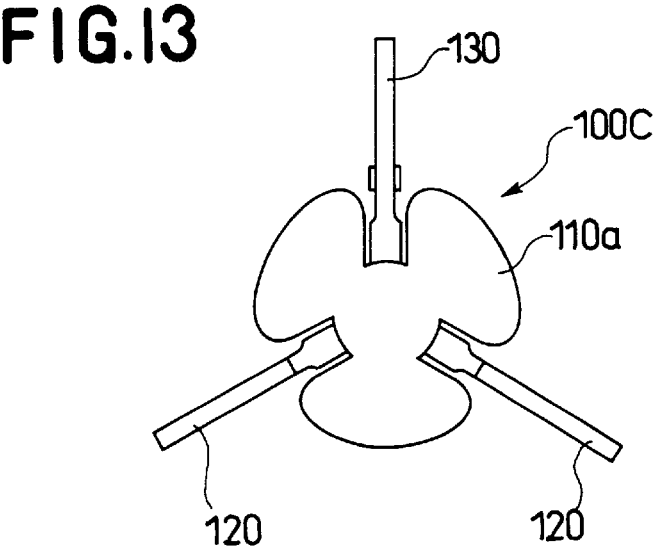
FIG. 13 is a plan view of a three-legged CD ejector device of the second improved type.

The three-legged ejector device 100C shown in FIG. 13 comprises two push plates 120, one spring plate 130 and three eaves members 110a. Because this ejector device 100C has fundamentally the same function and effect as those of the ejector device 100 described above, its explanation will be omitted.

(4) The CD ejector device explained above provides the following effects.

The ejector device can be easily fitted into, and disposed inside, the engagement portion of the disk support portion at the center of the tray of the CD cases that have been already put on the market. The CD held in the case can be easily and reliably ejected by one-touch operation by gently pushing the push member of the CD ejector device positioned at the center of the engagement portion by the finger tip.

Because the push plates and the spring plate(s) are so disposed as to extend equidistantly and radially from the push member as the center, the CD ejector device has a design that provides a stable feel.

The engagement protuberance is formed on the side surface(s) of the spring plate. This protuberance is anchored to the side surface of the groove of the engagement portion and prevents the CD ejector device from falling off from the engagement portion or its shake.

Since the CD ejector device is produced by integral molding of a synthetic resin, it can be colored easily in a desired color, and can be mass-produced economically because the device is extremely small in size.

In the CD ejector device having the eaves members in the present invention, the eaves member comes into contact with, and covers, the distal end portion of the protruding plate and the upper surface of the push member is positioned above the distal end portion of the protruding plate even in the case of the disk support portion of the tray in which the protruding plate is formed higher than the ejector device. Therefore, the push member can be easily pushed.

When the eaves member is pushed, the distal end portion of the protruding plate is reliably pushed down, the diameter of the engagement portion shrinks, the push-up portion of the push plate reaches the upper surface of the main body at the bottom and is pushed to this main body and the distal end of the push plate is jumped up, so that the CD engaging with the engagement portion 3 is pushed up and can be easily ejected from the engagement portion.

When the CD case is held by one hand and the push member of the ejector device protruding from the upper surface of the protruding plate is pushed by the forefinger of the other hand, the disk support portion lowers as the eaves member is pushed and the gap between the disk support portion and the main body at the bottom does not expand even though the main body at the bottom is pushed, deflected and curved by the push plate. Therefore, the distal end of the push plate which is jumped up sufficiently protrudes from the disk portion, reaches the CD engaging with the engagement portion and can easily eject the CD.

What is claimed is:

1. A CD ejector device comprising:

a push member; and a plurality of push plates and at least one spring plate extending from said push member in such a fashion as to be capable of being accommodated inside radial grooves defined in a disk support portion at the center of a tray of a CD case;

said push plates each comprising a spring portion extending obliquely downwardly from said push member and a portion connected to said spring portion through a joint portion and extending horizontally from the spring portion, whereby when said push member is pressed down, said spring portion is flexed so that a leading end of said portion extending horizontally from said spring portion is raised with said joint portion as a fulcrum, said CD ejector device being molded integrally from a synthetic resin.

2. A CD ejector device according to claim 1, wherein said plurality of push plates and said at least one spring plate extend equiangularly from said push member.

3. A CD ejector device comprising:

a push member;

a plurality of push plates and at least one spring plate extending from said push member in such a fashion as to be capable of being accommodated inside radial grooves defined in a disk support portion at the center of a tray of a CD case; and eaves members so disposed at an upper end of said push member as to extend in a transverse direction and to come into contact with said disk support portion;

said push plates each comprising a spring portion extending obliquely downwardly from said push member and a portion connected to said spring portion through a joint portion and extending horizontally from the spring portion, whereby when said push member is pressed down, said spring portion is flexed so that a leading end of said portion extending horizontally from said spring portion is raised with said joint portion as a fulcrum, said CD ejector device being molded integrally from a synthetic resin.

4. A CD ejector device according to claim 3, wherein the number of said eaves members is two to four, and said eaves members extend substantially equidistantly and radially from said push member as the center.

5. A CD ejector device according to claim 3, wherein said plurality of push plates and said at least one spring plate extend equiangularly from said push member.

6. A CD device according to claims 1, 3 or 4, wherein at least one engagement protuberance is formed on at least one side surface of each of said at least one spring plate to engage with at least one side surface of a corresponding groove.

7. A CD ejector device according to claims 1, 3 or 4, wherein the number of said push plates is two, the number of said spring plates is one, and said push plates and said spring plate extend substantially equidistantly and radially from said push member with said push plate as the center.

8. A CD ejector device according to claims 1, 3 or 4 wherein the synthetic resin is selected from the group consisting of nylon resin and polyacetal resin.

9. A CD ejector device according to claims 1, 3 or 4, wherein the number of said push plates is three, the number of said spring plates is one, and said push plates and said spring plate extend substantially equidistantly and radially from said push member with said push plate as the center.

* * * * *